C. L. PREINSLER.
DEVICE FOR HEATING AND VAPORIZING LIQUIDS.
APPLICATION FILED DEC. 12, 1913.
1,103,830.
Patented July 14, 1914.
2 SHEETS—SHEET 1.
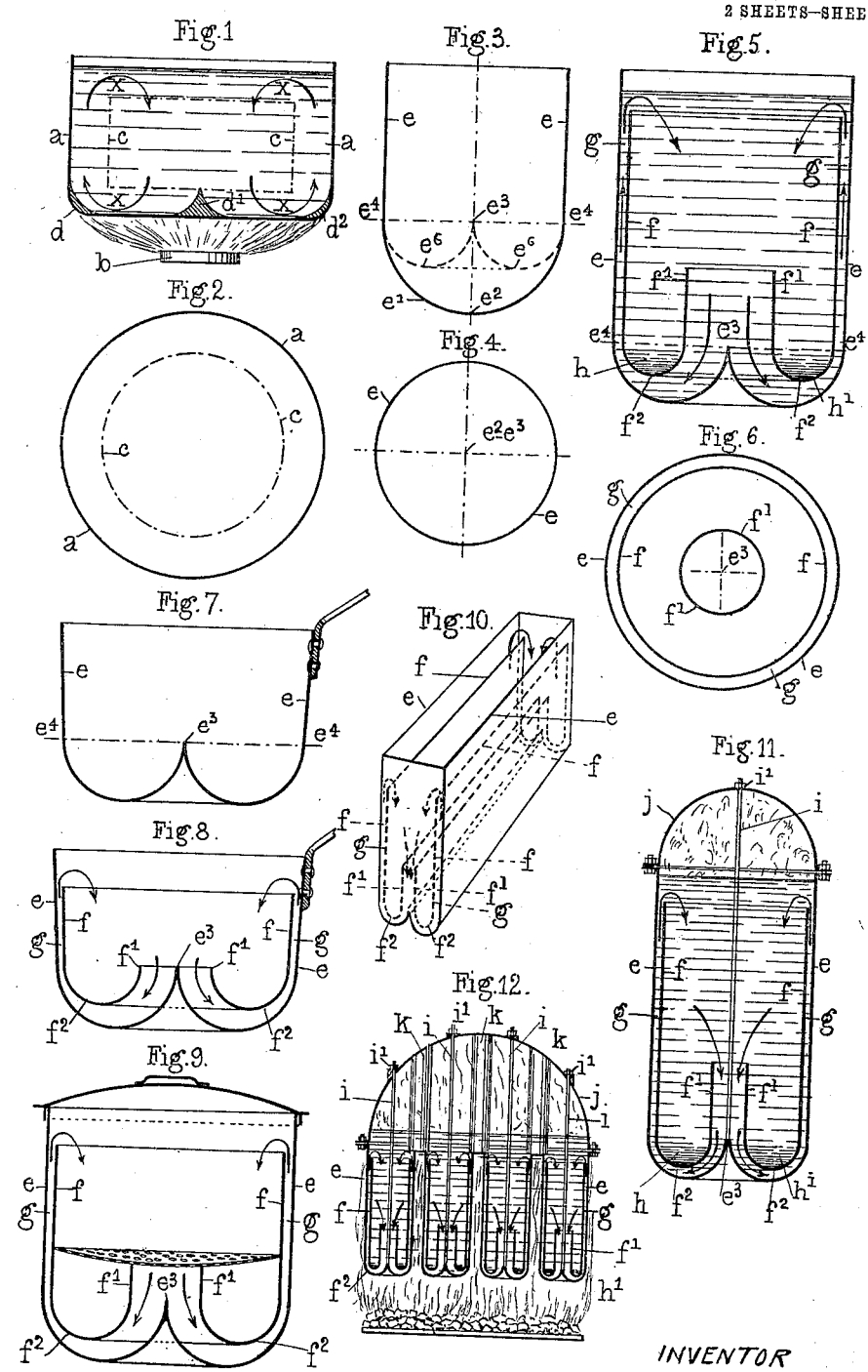
INVENTOR
CHARLES L. PREINSLER
BY
his ATTORNEYS
WITNESSES C. L. PREINSLER.
DEVICE FOR HEATING AND VAPORIZING LIQUIDS.
APPLICATION FILED DEC. 12, 1913.
1,103,830.
Patented July 14, 1914.
2 SHEETS—SHEET 2.
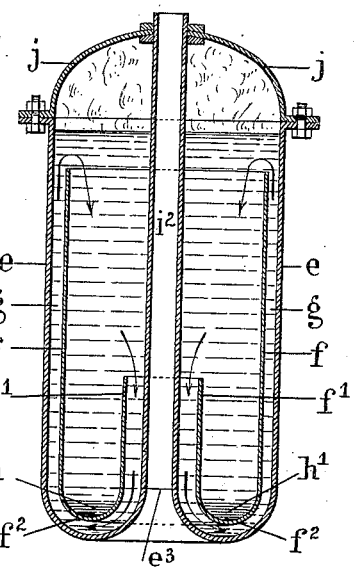
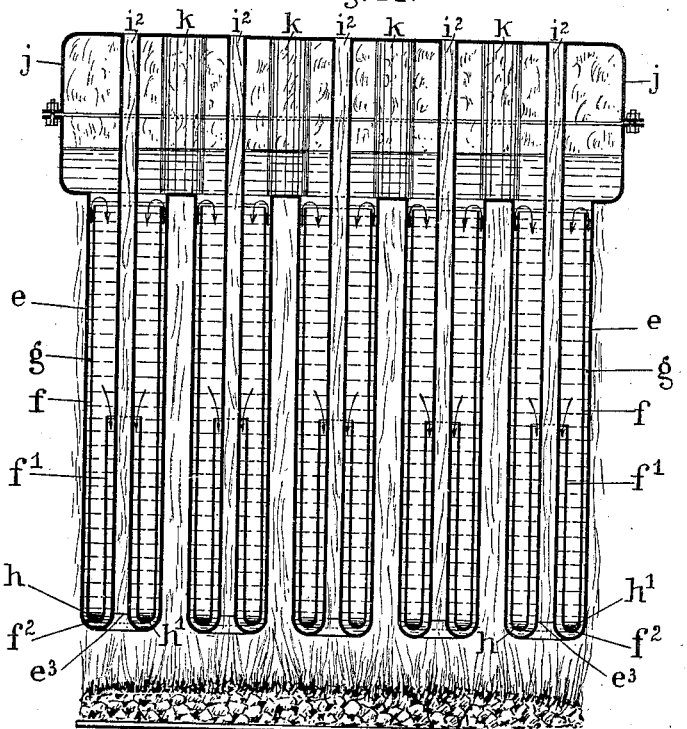
WITNESSES
INVENTOR
CHARLES LUCIEN PREINSLER
BY
Attorneys

UNITED STATES PATENT OFFICE.

CHARLES LUCIEN PREINSLER, OF RHEIMS, FRANCE.

DEVICE FOR HEATING AND VAPORIZING LIQUIDS.

1,103,830.  Specification of Letters Patent.  Patented July 14, 1914.

Application filed December 12, 1913. Serial No. 806,309.

*To all whom it may concern:*

Be it known that I, CHARLES LUCIEN PREINSLER, a citizen of the Republic of France, and a resident of No. 12 Rue Ruinart de Brimont, Rheims, Department of Marne, France, have invented new and useful Improvements in Devices for Heating and Vaporizing Liquids, of which the following is a specification.

The invention relates to an improvement in open or closed receptacles adapted for the heating or vaporization of liquids.

The accompanying drawing illustrates several embodiments of the invention.

Figure 1 is a vertical section through a receptacle of a known kind. Fig. 2 is a plan of Fig. 1. Fig. 3 is a vertical section through a receptacle constructed in accordance with the invention. Fig. 4 is a plan of Fig. 3. Fig. 5 is a vertical section through a second embodiment of a receptacle constructed in accordance with the invention, and Fig. 6 is a plan of Fig. 5. Figs. 7–12 show further embodiments of receptacles which serve for the heating or vaporization of liquids only. Fig. 13 is a vertical section, and Fig. 14 a longitudinal section through a further modification of my invention.

If a liquid contained in a receptacle $a$ (Figs. 1 and 2) is subjected to the action of a source of heat $b$ then, on the assumption that the whole surface of the bottom of receptacle is heated, convection movements of the liquid particles are produced which take place in the direction indicated by the arrow $x$. Experience has taught that the whole liquid mass moves about an imaginary cylinder $c$ in such a manner that the cross-sectional area of the annular space between the cylinders $a$ and $c$, is equivalent to that of the cylinder $c$. It follows therefrom that the circulation of the liquid at the points $d$, $d'$, $d^2$ of the receptacle is very weak and that deposits or other sediments tend to accumulate at these points. These occurrences which are well known, take place in exactly the same manner in commercial steam generators and are very often the cause of deposits which give rise to terrible accidents.

The purpose of the invention is to eliminate this drawback.

It consists in constructing the liquid receptacle in such a manner that the whole liquid mass which comes into contact with the heated surfaces, is set into motion during the heating at a speed which is equal at all points. This result can be obtained, for example, by a special construction of the liquid receptacle, preferably by providing an inner partition which is so arranged that the deposits accumulate at a point where they can be readily collected and cannot cause any danger.

The characteristic construction of the receptacle in accordance with the invention is shown in Figs. 3 and 4. It is formed by indenting the spherical bottom $e'$ of a cylinder $e$ in such a manner that the lowermost point $e^2$ of the bottom is shifted upward toward $e^3$ and the point $e^3$ thus produced is located in the plane $e^4$ of the spherical cap $e'$ and that the two semi-circles $e^5$, $e^6$ which appear in any diametral vertical section through the cap $e'$ (Fig. 3) have their centers located in the plane $e^4$. Briefly, the bottom of the receptacle presents the form of the lower half of a torus with a vertical axis, the generating circle of which is tangential to the axis of rotation.

The arrangement can be still further completed by providing within the receptacle constructed in this manner, a partition (Figs. 5 and 6) which consists of two concentric cylinders $f$ and $f'$ connected, at their lower ends, by a half torus $f^2$, so that the annular cross-sectional area $g$ between the cylinders $f$ and $e$, is equal to the cross-sectional area of the cylinder $f'$. If such a receptacle is filled with liquid and heated from the exterior, a rapid circulating movement of the liquid is produced in the direction indicated by the arrows. The rapidity of this movement is constant from the inlet opening of the cylinder $f'$ to the outlet from the annular space g, as the cross-sectional area of this course of the liquid is equal throughout. After leaving the annular space g the velocity of the liquid diminishes according as the cross-section of the passage increases and the deposits which have been carried away therewith accumulate at $h$, $h'$ wherefrom they can be easily removed. It will be thus seen that the velocity of the liquid remains constant during the time it moves along the heated surfaces and that the deposits are out of contact with these surfaces that is to say they accumulate at a point where they cannot cause any danger. It will be seen further that all parts of the receptacle are easily accessible and can be completely cleansed.

The distance between the cylinder $e$ and the partition $f$ may be insured preferably by stays or the like which are soldered either on the cylinder $e$ or on the partition $f$ only, in such a manner that the said partition may be readily removed without any difficulty.

The device in accordance with invention is also applicable to boiling pans, see Figs. 7 and 8, and to washing coppers, Fig. 9.

The constructions described above show round shapes. The invention may also be embodied in elongated structures of generally rectangular outline such as shown in Fig. 10 and in which a transverse vertical section at any point corresponds to the diametral vertical section through the tubular construction (Fig. 5 for instance). These constructions have the same advantages as that described hereinbefore and can be utilized in cases where a long heating receptacle is required such as insertion of boilers for kitchen ranges.

In the adaptation of the invention to commercial boilers, or to operating apparatus in general in which the boilers are under pressure, the conical point $e^3$ is supported by a bolt $i$ (Fig. 11), the threaded end of which is engaged by a nut $i'$ above the top of the boiler. It is advantageous to replace the bolt by a hollow tube $i^2$ (Fig. 13) through which the gases of combustion may be passed thus augmenting the heating surface.

When a longer heating surface is requisite, a number of heating elements analogous to those shown in Figs. 11 and 13 may be grouped together as shown in Figs. 12 and 14, and in these constructions, main flues $k$ are provided.

If the necessary heating surface is large, it is possible to group a suitable number of elements similar to these shown in Fig. 11, to form a generator as shown in Fig. 12; $k, k$ being the flame or smoke tubes.

The elements of this generator may, moreover, be joined into an oblong form as shown in Fig. 10; in the latter case the point $e^3$ forms an edge which is connected to the cover of the boiler by means of a series of stays.

Briefly the device in accordance with the invention solves in a practical manner, the problem which the engineer has set himself since a long time, namely to realize a vaporizing apparatus built up from U-shaped tubes of constant area, the returns of which are not heated.

It is evident that the invention is not restricted to the construction described hereinbefore, as it can be carried out in any manner based upon the principle of the invention.

Having now particularly described and ascertained the nature of my said invention and in what manner the same is to be performed, I declare that what I claim is:—

1. A tubular container for heating liquids having a bottom centrally recessed substantially as described, in combination with partitioning arranged therein and comprising a tubular member inwardly recurved at its lower end to form an inner tubular passageway spaced from the outer walls thereof, the latter being arranged within the tubular container and spaced therefrom to afford a circulatory passage between the same, said passageway corresponding substantially in cross sectional area to that of the inner tubular passageway.

2. A tubular container for heating liquids having a bottom centrally recessed substantially as described, in combination with partitioning arranged therein and comprising a tubular member inwardly recurved at its lower end to form a relative short inner tubular passageway spaced from the outer walls thereof, the latter being arranged within the tubular container and spaced therefrom to afford a circulatory passage between the same, said passageway corresponding substantially in cross sectional area to that of the inner tubular passageway.

3. In a container for heating liquids, a convex bottom centrally recurved substantially as described, in combination with a cover for said container and a stay bolt extending between said cover and the central recurved portion of the bottom, for the purpose described.

4. In a container for heating liquids, a convex bottom centrally recurved substantially as described, in combination with a cover for said container and a hollow stay bolt extending between said cover and the central recurved portion of the bottom to permit the combustion gases to pass therethrough and thus increase the heating surface of the container.

5. A multi-unit boiler for liquids, comprising a plurality of heating units each comprising a liquid container having internal partitioning which forms inner and outer communicating circulatory channels of substantially equal cross sectional area, said units being spaced apart together with flues arranged in extension of said spaces between the heating units to permit the flow of the gases of combustion therethrough, substantially as described.

In testimony whereof I have signed my name to this specification in the presence of two subscribing witnesses.

CHARLES LUCIEN PREINSLER.

Witnesses:
H. BARDEL,
S. BARDEL.